United States Patent
Schreiter (10) Patent No.: US 9,603,445 B2
(45) Date of Patent: Mar. 28, 2017

(54) WORK TOP WITH EXTENSIBLE RETAINING MEANS

(71) Applicant: Johannes Schreiter, Offenbach (DE)

(72) Inventor: Johannes Schreiter, Offenbach (DE)

(*) Notice: Subject to any disclaimer, the term of this patent is extended or adjusted under 35 U.S.C. 154(b) by 0 days.

(21) Appl. No.: 14/395,675

(22) PCT Filed: Apr. 5, 2013

(86) PCT No.: PCT/EP2013/057217
§ 371 (c)(1),
(2) Date: Oct. 20, 2014

(87) PCT Pub. No.: WO2013/160086
PCT Pub. Date: Oct. 31, 2013

(65) Prior Publication Data
US 2015/0076974 A1    Mar. 19, 2015

(30) Foreign Application Priority Data
Apr. 27, 2012    (DE) .................... 20 2012 004 306 U (51) Int. Cl.
*A47B 17/03*    (2006.01)
*A47B 77/02*    (2006.01)
(Continued)

(52) U.S. Cl.
CPC .......... *A47B 17/036* (2013.01); *A47B 77/022* (2013.01); *A47B 96/18* (2013.01);
(Continued)

(58) Field of Classification Search
CPC .. A47B 3/06; A47B 3/12; A47B 21/03; A47B 13/081; A47B 13/14; A47B 13/16;
(Continued)

(56) References Cited

U.S. PATENT DOCUMENTS 132,165 A * 10/1872 Maples .............. A47B 88/0407
                                                    312/140.4
134,904 A *  1/1873 Loth ............................. 108/78
(Continued)

FOREIGN PATENT DOCUMENTS

DE    2856168      7/1980
JP    2000037251   2/2000

OTHER PUBLICATIONS

International Search Report issued in PCT Application No. PCT/EP2013/057217.
International Search Report dated Jul. 4, 2013.

*Primary Examiner* — Andrew Roersma
(74) *Attorney, Agent, or Firm* — Roger D. Emerson; Emerson Thomson Bennett LLC (57) ABSTRACT

Provided is a work top with extensible retainer. An extensible retainer may be configured as a U-shaped bracket either introduced laterally into the work top or introduced into a retaining frame, located beneath the work top, or introduced laterally into a drawer, located beneath the work top, or guided through bracket holders fitted beneath the work top. If an extensible retainer is in the extended state, then it is possible to fit waste containers therein. An extensible retainer allow containers to be fitted in a space-saving and straightforward manner. An extensible retainer may be fitted on more than one side of the work top. A plurality of extensible retainers in combination with one another may receive one or more containers.

1 Claim, 6 Drawing Sheets (51) Int. Cl.
*A47B 96/18* (2006.01)
*A47J 45/02* (2006.01)
*B25H 1/12* (2006.01)
*A47J 47/16* (2006.01)

(52) U.S. Cl.
CPC ............... *A47J 45/02* (2013.01); *A47J 47/16* (2013.01); *B25H 1/12* (2013.01); *A47B 2200/0085* (2013.01)

(58) Field of Classification Search
CPC ..... A47B 13/003; A47B 13/02; A47B 13/006; A47B 1/04; A47B 1/05; A47B 1/08; A47B 45/00; A47B 46/00; A47B 17/03; A47B 17/033; A47B 17/036; A47B 77/022; A47B 96/18; A47B 2200/0011; A47B 2200/0085; A47B 2200/09
See application file for complete search history.

(56) References Cited

U.S. PATENT DOCUMENTS

| | | | | |
|---|---|---|---|---|
| 456,614 A * | 7/1891 | Christensen | ........... | 211/119.005 |
| 1,524,767 A * | 2/1925 | Vandervoort | ................... | 108/76 |
| 1,708,424 A * | 4/1929 | McLeskey | .............. | F24C 15/12 |
| | | | | 126/332 |
| 2,230,793 A * | 2/1941 | Borah | .................... | A47B 61/00 |
| | | | | 211/1.3 |
| 2,508,804 A * | 5/1950 | Schwindt | ........................ | 108/93 |
| 2,943,902 A * | 7/1960 | McMechen | .................. | 312/285 |
| 3,301,406 A * | 1/1967 | Scott | ........................ | 211/88.01 |
| 3,317,260 A | 5/1967 | Levit et al. | | |
| 3,401,650 A * | 9/1968 | Terezas | ........................... | 108/25 |
| 3,497,076 A * | 2/1970 | O'Brien | ........................ | 211/1.3 |
| 3,499,541 A * | 3/1970 | Mackie | ........................ | 211/134 |
| 3,508,666 A * | 4/1970 | Schwengel | .................... | 211/208 |
| 3,515,077 A * | 6/1970 | Glowacki | ........................ | 108/89 |
| 3,701,576 A | 10/1972 | Moen | | |
| 4,155,310 A * | 5/1979 | Gregory | .................. | B43L 19/00 |
| | | | | 108/26 |
| 4,157,070 A * | 6/1979 | Huempfner et al. | ........... | 108/28 |
| 4,363,587 A | 12/1982 | Rooklyn | | |
| 4,729,613 A * | 3/1988 | Tromble et al. | ........... | 312/270.3 |
| 4,944,566 A * | 7/1990 | Carper | .................... | F25D 25/02 |
| | | | | 312/246 |
| 5,044,704 A * | 9/1991 | Bussan et al. | ................. | 312/402 |
| 5,294,194 A * | 3/1994 | Lombardo | ........... | A47G 29/093 |
| | | | | 220/482 |
| 6,224,176 B1 * | 5/2001 | Suzuki | ......................... | 312/278 |
| 6,938,784 B2 * | 9/2005 | Yang | ........................ | 211/87.01 |
| 8,100,062 B1 * | 1/2012 | Anghel | ........................ | 108/69 |
| 2005/0040745 A1 * | 2/2005 | Herman | ................. | A47B 77/18 |
| | | | | 312/280 |

\* cited by examiner

WORK TOP WITH EXTENSIBLE RETAINING MEANS

CROSS-REFERENCE TO RELATED APPLICATIONS

This application is a U.S. national stage of PCT/EP2013/057217 filed on Apr. 5, 2013 which claims the benefit of priority from German Patent Application No. 202012004306.4 filed Apr. 27, 2012, the contents of each of which are incorporated herein by reference.

FIELD OF THE INVENTION

The present invention relates to a worktop having extendable retaining devices. When these retaining devices are in the extended state, containers which may serve for receiving waste, for example, may be inserted. The extendable retaining devices enable a space-saving and simple attachment of the containers. Attachment of the retaining device is also possible on a plurality of sides of the worktop. Furthermore, a plurality of retaining devices in combination with one another may receive one or more containers.

BACKGROUND OF THE INVENTION

In the prior art worktops which make storage space accessible to the user of the worktop are known. In this manner, a cutting board which disposes of a drawer which is integrated in the box-shaped support part of the cutting board is known from DE 10 2006 059484 B4. On account of this construction it is possible to rapidly transfer kitchen waste into the drawer. However, on account of the design concept, the volume of the drawer is limited and the latter is consequently only suitable for small amounts. Exchanging the drawer is indeed possible, but here it has to be completely pulled out from the cutting board. If the drawer is heavily filled, this could prove to be difficult, since the contents could come into contact with the underside of the cutting board and, when pulling it out, force can initially be only laterally applied on the drawer. Moreover, it is disadvantageous in the case of this invention that the drawer is in direct contact with the worktop. The contents of the drawer thus easily make their way to the worktop and possibly also to the guides of the drawer, which may lead to contamination of the device.

DE 20 2006 009121 U1 discloses a worktop on which containers may be laterally attached. These containers are attached to the worktop by means of a guide mechanism or a magnetic mechanism. Both options are distinguished by advantages and disadvantages. Attaching the containers by means of a magnetic mechanism permits easy insertion and lifting-out of the containers; however, the contents of the containers must not be too heavy since otherwise the containers cannot be retained. Attaching the containers by means of a rail also permits containers having a significant weight to be retained; however, the attachment by way of a guide rail is very impractical when swapping the containers. In the case of this invention, the containers moreover have always to be equipped with a special connection mechanism (magnet, rail insert).

Insertion devices which dispose of an extendable frame are known from the prior art. DE 1731128 U describes an extendable frame having a support rail for document carriers. Here, this is a fitting for writing desks which can be pulled out from the writing desk and which serves for suspending files or other documents. On account of its orientation, this frame is indeed not suitable for suspending containers, and its installation is in no way implemented in a space-saving manner.

A stove having an exendable frame is furthermore known from U.S. Pat. No. 1,708,424 A. Containers may be inserted into the extended frame. However, here only one frame is employed on one side of the stove, but not on a plurality of sides. Furthermore, only one frame is used here for suspending one container. In certain circumstances, a container which has been excessively filled may not be adequately supported. Therefore, an oblique stay (33) is additionally required for support, see FIG. 7. It can be seen in FIG. 2 that the frame for containers to be inserted makes available suitable storage surfaces on all four sides. This indeed ensures comparatively high stability, however commits the frame to exactly one container size.

OBJECT OF THE INVENTION

It is an object of the present invention to provide a worktop which is capable of retaining containers on at least one side of the worktop, wherein easy swapping of the containers should be possible and the suspension devices should not take up any space when they are not in use. Suspension should be possible without the container having to be equipped with additional suspension devices. Furthermore, flexible suspension of containers of variable sizes and optionally of one or more containers on one side should be possible. It should also be possible for heavy containers to be suspended on the worktop.

SUMMARY OF THE INVENTION

The object is achieved by the worktop as claimed in claim 1, characterized in that said worktop displays an extendable retaining device which is implemented as a U-shaped bracket. Here, U-shaped is not only intended to include shapes in which the connecting line between the left and right part of the letter is outwardly curved in the shape of an arc, but also those in which the connecting line is defined as a straight line or in which the connecting line is defined as a straight line which, to the left and the right part of the letter, in each case displays a rounded corner. The retaining device may be installed in the worktop in various ways. It is relevant here that both bracket ends are at the same height. In a preferred embodiment, the two bracket ends are laterally guided into the worktop at a 90° angle. In a further preferred embodiment, the two bracket ends are guided through bracket mounts which are attached below the worktop, wherein the bracket ends and the worktop form a 90° angle in relation to one another. In a third preferred embodiment, the bracket ends are guided at a 90° angle into a retaining frame which is either fixedly or exchangeably attached to the underside of the worktop. In each of the preceding cases, the 90° angle should lie in the plane of the worktop. The embodiments display various advantages. In this manner, guiding the bracket through the worktop is particularly simple and permits the bracket to be attached high. Attaching the brackets by means of bracket mounts may be esthetically advantageous, since no drilling of holes is necessary and the brackets, in the case of a corresponding installation, are not visible in the retracted state. The bracket frame offers the advantage of an attachment without the use of bracket mounts and without holes having to be drilled into the worktop. An exchangeable retaining frame permits swapping of only the worktop in the case of a soiled or worn worktop, while the retaining frame including the retaining device can be kept. Moreover, the retaining devices may be incorporated in extendable drawers which are located under the worktop.

When the retaining device is extended, containers may be inserted thereinto. Suitable containers have a periphery which protrudes at the top and which can be inserted into the bracket. Depending on the extension length of the bracket, insertion options of various dimensions result. In this manner, containers of various sizes can be suspended on one retaining device. The use of containers conforming to Gastronorm (EU standard EN 631) is particularly advantageous here. However, the use of containers with other dimensions is also possible.

A worktop with a retaining device for containers is advantageous in many types of applications. An exemplary type of application here is the use of the worktop in a kitchen. Here, cutting work is often carried out on worktops, wherein cut foodstuffs and/or waste which arises during cutting are/is to be removed as swiftly as possible from the worktop. It is advantageous here for a retaining device to be able to keep ready containers on the worktop into which the accumulating fruits of labor can be directly transferred. It is evident here that it is particulary advantageous for the containers to be able to be rapidly swapped, since in this manner full containers can be moved in a simple manner to other worktops for further processing, and an empty container can be directly inserted into the worktop. On account of the highly minimalistic execution of the retaining device in constructive terms, it is ensured that said retaining device can also be cleaned in a very simple manner. In the end, the device according to the invention is space saving, since the retaining device can be retracted when the containers are not in use. It goes without saying that other types of applications are also possible besides the application of such a worktop for the purpose of kitchen work. In this manner, the worktop may also be a worktop for employment in a woodturning workplace, a watchmaker's workplace, a nail studio workplace, a precision mechanic's workplace, an electronic technician's workplace, or any other workplace in which it is desirable to keep the worktop free from the fruits of labor and/or waste.

In a particularly advantageous embodiment, a plurality of retaining devices are employed in combination with one another. In this manner, an outer retaining device may be segmented by a plurality of inner retaining devices. On account of its shape, the insertion option resulting from the combination of the retaining devices permits a plurality of containers to be inserted. As an insertion option every option for inserting containers which results from the use of one or more retaining devices is to be defined. Inserting a container which is in itself segmented, having a plurality of support surfaces, is also conceivable when using a plurality of retaining devices in combination. This may be particularly important in the case of a container having a large volume and also, therefore, a large maximum weight having to be supported by the retaining devices. One retaining device alone under certain circumstances does not have the required stability therefor. Here, the employment of a plurality of retaining devices in combination may provide a remedy. The retaining devices acting in combination are attached to the worktop at the same height.

In a further potential embodiment, the retaining devices acting in combination with one another are independently movable from one another. As an example, an outer retaining device which is employable in combination with an inner retaining device may be stated. Depending on the type of application, in this case either only the outer retaining device may be extended in order to enable the insertion of a large container, or outer and inner retaining devices may be extended in order to enable the insertion of two smaller containers. It is furthermore possible for arbitrary extension lengths of the retaining devices to be combined with one another. The insertion options which result from the interaction of the retaining devices may thus assume a multiplicity of shapes.

In a further potential embodiment, the retaining devices which act in combination with one another cannot be moved independently of one another. As an example, an outer retaining device which is employed in combination with an inner retaining device may be stated. On account of a connection between an outer and an inner retaining device, these retaining devices are only collectively movable. This is desired in the case when it is known that the retaining devices are always only to be employed in combination with one another.

In the case of the present invention it is possible for a plurality of retaining devices to be attached on one worktop. It is possible here that these retaining devices do not have to act in combination with one another. In this manner, a plurality of retaining devices on a worktop may be fastened below and/or beside one another. An embodiment according to the invention provides that retaining devices are attached on a plurality of sides of the worktop, such that containers may be inserted on different sides of the worktop. On account thereof it is made possible for a large total volume to be provided also in the case of small worktops. Attaching retaining devices on different sides of the worktop requires that said retaining devices are attached at different heights, as they would otherwise collide with one another.

When using a worktop, the products being processed should not be able to fall on the floor. Therefore, a gap between the worktop and the inserted container is not desired, as in the rapid transfer of materials from the worktop into the container, part of these materials may fall into the gap. For this reason, the worktop in one potential embodiment disposes of a clearance in the region of the insertion option. This clearance is dimensioned in such a manner that an inserted container is in part located under the worktop in the region of the clearance. On account thereof, an undesirable gap between the worktop and the container is avoided.

In a preferred embodiment the retaining device is capable of latching at various extension lengths. On account thereof, it is ensured that any coincidental modification of the extension length does not happen. Mechanical forces which influence the extension length may arise during use. This is undesirable, since it should be ensured that the container lies flush against the worktop, if possible. This is only the case when the retaining device has an extension length which corresponds to the container. It is furthermore preferred for a maximum extension length to be set by way of constructive means. This may be effected, for example, by way of a widening of the bracket ends.

The device according to the invention may be furthermore equipped with one or more drawers. These are to be installed below the worktop. On account of the retaining devices being implemented so as to be movable, use of the drawers is always possible when the containers are unhooked and the retaining devices are retracted. Furthermore, the drawers should be attached at an adequate vertical distance from the retaining devices, such that access to the drawers is also possible when containers are inserted into the retaining devices.

BRIEF DESCRIPTION OF THE DRAWINGS

Embodiments according to the invention are illustrated in the images as follows.

In the following, five potential embodiments which are graphically illustrated in FIGS. 1 to 11 are described. These embodiments here are not to be understood in a limiting but only an exemplary manner.

Detailed Description of the Drawings

Figure 1:
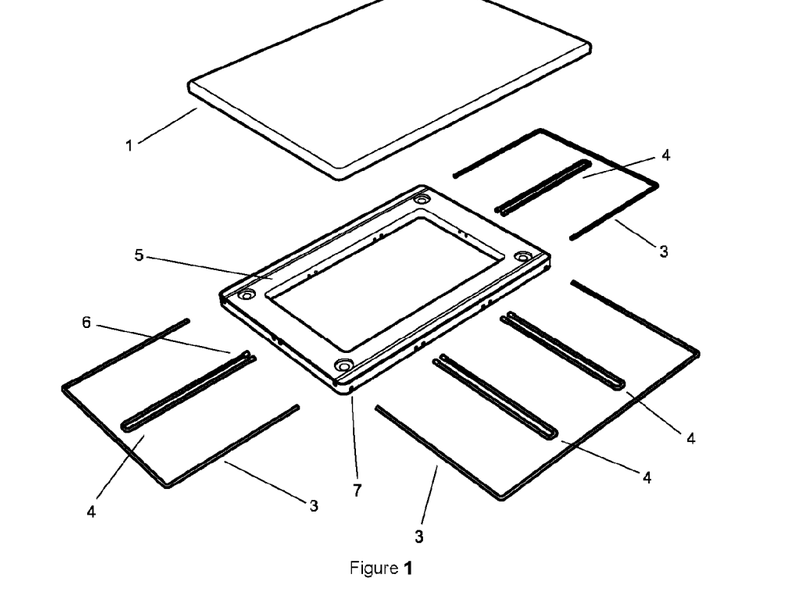
FIG. 1, in a perspective view, shows an exploded illustration of a potential embodiment of the worktop, having an extendable retaining device, wherein the retaining devices are retained by a suitable retaining frame.
Figure 2:
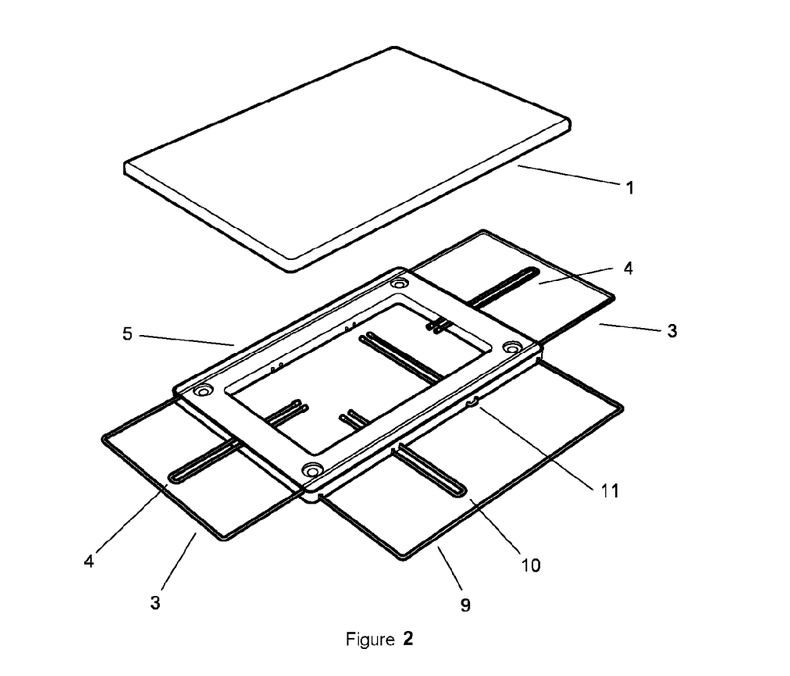
FIG. 2 shows the same embodiment of the worktop as an exploded view, wherein the retaining devices are incorporated in the retaining frame.
Figure 3:
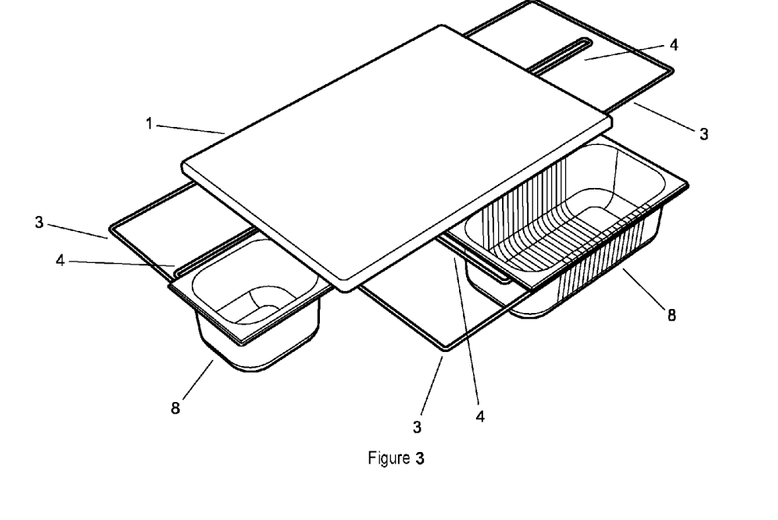
In FIG. 3, this embodiment is shown assembled while in use with containers.

A first embodiment is illustrated in FIGS. 1, 2 and 3. FIG. 1, in an exploded view, shows the substantial component parts of this embodiment. The embodiment includes a worktop (1) which is mated with a retaining frame (5). This connection may be permanent or releasable. A releasable connection may be established, for example, by way of plug-type connections and/or magnets. The retaining frame (5) is suitable for receiving a plurality of retaining devices (3, 4). For this purpose, the retaining frame (5) has special borings (7). Here, a distinction is to be made between outer retaining devices (3) and inner retaining devices (4). A plurality of inner retaining devices (4) may be attached, framed by an outer retaining device (3). As can be seen in FIG. 2, a retaining device may either be completely retracted (11), partially extended (10) or completely extended (9). FIG. 3 shows this embodiment in an assembled form, wherein two containers (8) here are retained by the retaining devices. These containers here may be retained only by the combination of outer retaining device (3) and inner retaining device (4). Furthermore, the containers in this embodiment should have dimensions according to Gastronorm (European standard EN 631). A particular advantage of this embodiment lies in that different worktops (1), for example worktops for various types of goods to be cut, may be used with the same retaining frame (5). Also in the case of wear or soiling, the worktops can be swapped in a simple manner, while the retaining frame (5) can continue to be used. The worktop (1) is dimensioned in such a manner that it completely projects beyond the retaining frame (5), such that no gap may arise between the worktop and the inserted containers (8). If this embodiment is used on a surface such as a kitchen worktop, it should preferably be positioned on the lateral periphery or at the corner of the surface.

Figure 4:
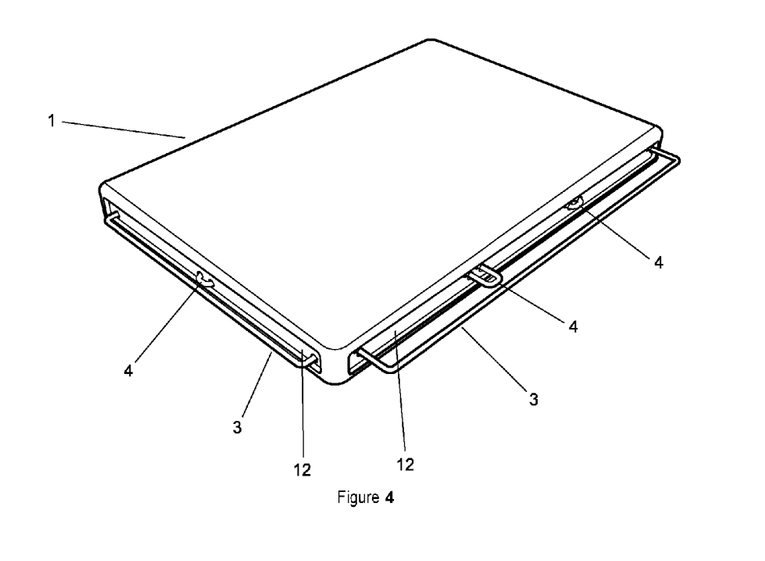
FIG. 4 shows a second embodiment in a perspective view, in which the retaining devices are incorporated directly in the worktop, wherein the retaining devices are retracted.
Figure 5:
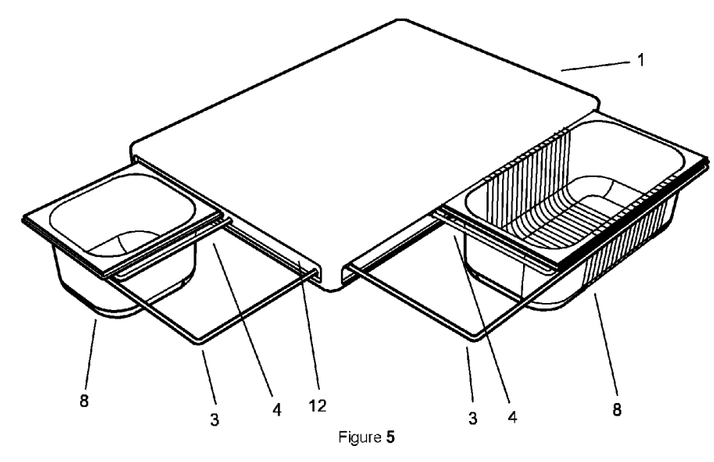
FIG. 5 shows a perspective view of the same embodiment in combination with containers, wherein the retaining devices are extended.

A second embodiment is illustrated in FIGS. 4 and 5. In this embodiment, the retaining devices (3, 4) are directly incorporated in the worktop (1), to which end a system of guide sleeves is used. These guide sleeves are guided through the worktop in a continuous manner. This enables simple cleaning of the guide sleeves, using for example a pipe cleaner or bottle cleaner. When this worktop (1) is on a table, it is possible to work diagonally across corners, thanks to this design. Many different extension combinations of the retaining devices (3, 4) for inserting containers (8) are possible. Here too, the containers (8) should be implemented according to EN 631. The board has a clearance (12) such that part of the upper periphery of containers (8) which are inserted comes to lie under the worktop in the clearance (12). This also ensures that in the case of this embodiment, it is possible to directly transfer products being processed from the board (1) into the container (8), without them being able fall into a gap between the board (1) and the container (8). On account thereof that the retaining devices are directly incorporated in the worktop (1), an esthetically particularly advantageous result is obtained. If this embodiment is used on a surface such as a kitchen worktop, it should preferably be positioned on the lateral periphery or at the corner of the surface.

Figure 6:
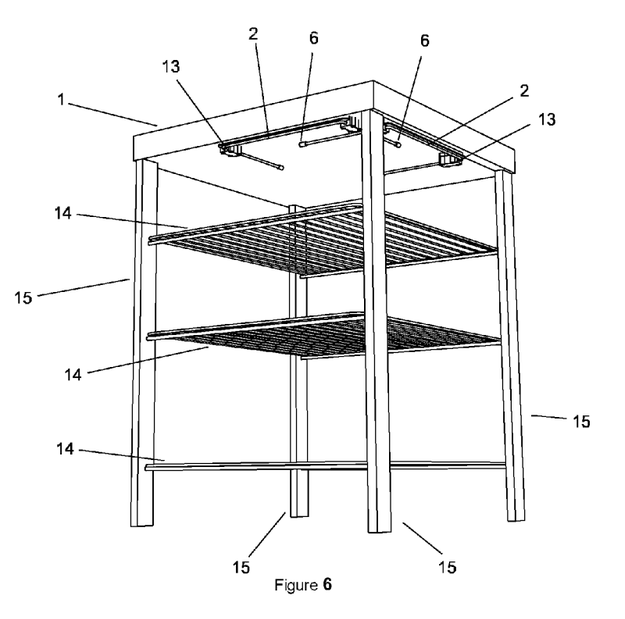
FIG. 6 shows a third embodiment in a perspective view, wherein here the worktop is on support legs and the retracted retaining devices are attached by means of special guides.
Figure 7:
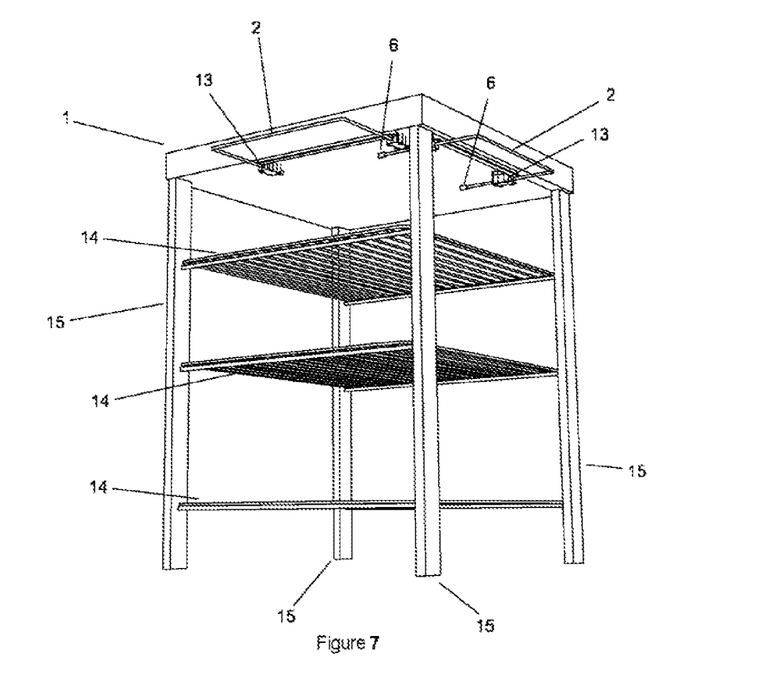
FIG. 7 shows the same embodiment in a perspective view, wherein the retaining devices are extended.

A third embodiment is illustrated in FIGS. 6 and 7. In the case of this embodiment, the worktop (1) is supported by four support legs (15) which are attached on the corners of the worktop. A plurality of gridiron mounts having a gridiron (14) are attached on these support legs. The removable gridiron permits additional objects to be stored below the worktop. The particular advantage of this embodiment lies in that additional storage space is created on the gridiron. Objects may also be located on the gridiron when containers are inserted in the retaining devices (2). A further particular feature of this embodiment is the fact that the retaining devices (2) are supported by means of special bracket mounts (13) below the worktop (1). This bracket mount (13) is fixedly screwed to the worktop (1). The bracket mount (13) produces an adequate distance between the underside of the worktop (1) and the retaining device (2). On account thereof it is ensured that a container which is inserted into the retaining device can also be pushed in part under the worktop (1), on account of which a gap between the worktop (1) and the container (8) can be avoided. Working diagonally across a corner is also very easily possible in the case of this embodiment.

Figure 8:
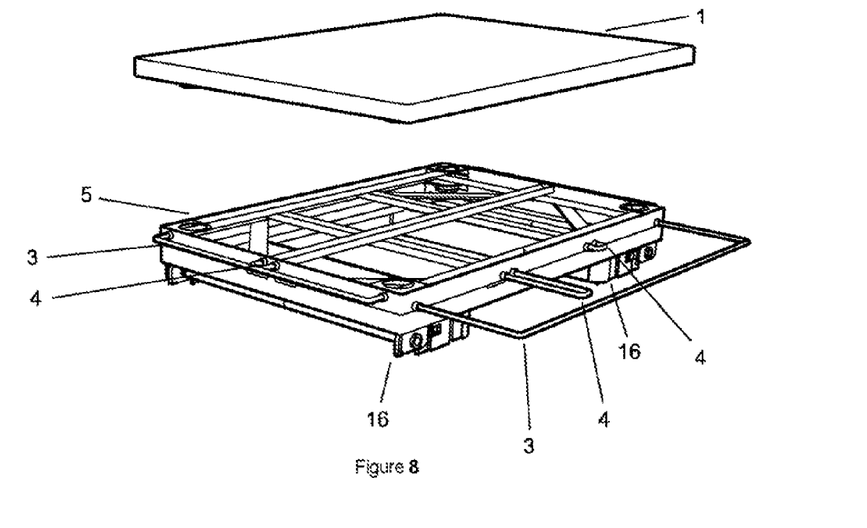
FIG. 8 shows a fourth embodiment in a perspective view as an exploded view, in which the retaining devices are retained by a retaining frame and the retaining frame is additionally provided with folded-in feet. The same embodiment is shown as an exploded view in FIG. 9, wherein the feet here are folded out.
Figure 9:
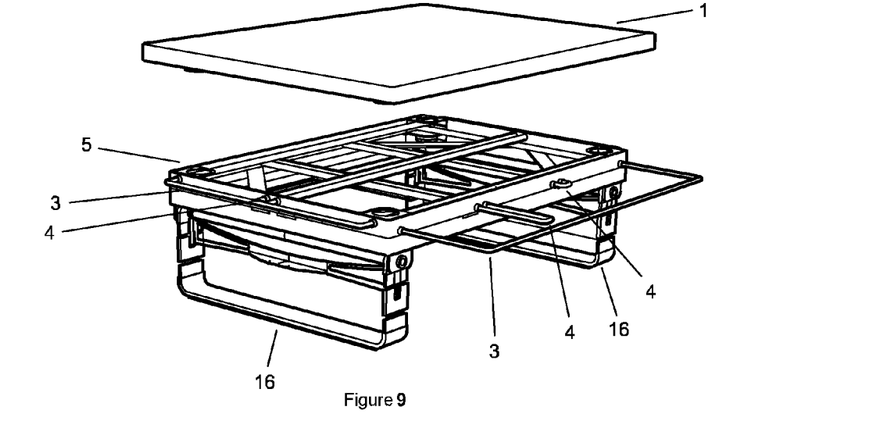
Figure 10:
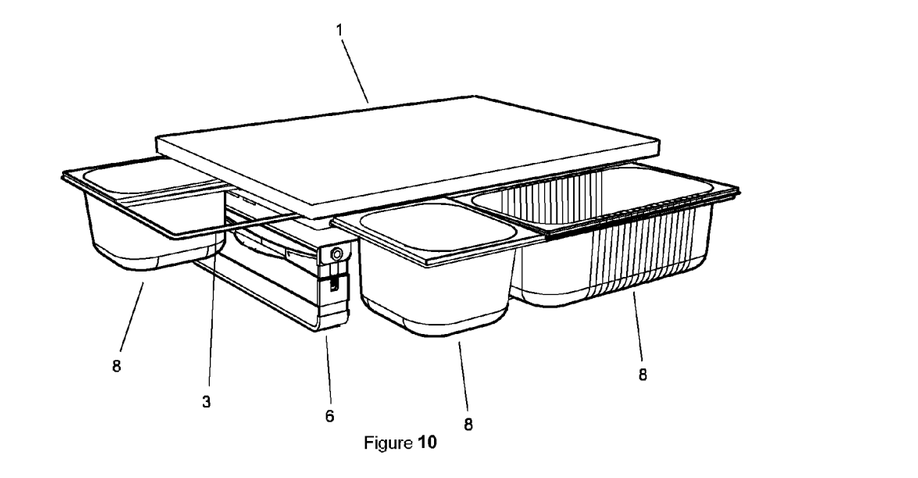
FIG. 10 shows this embodiment assembled, in use with containers.

A fourth embodiment is illustrated in FIGS. 8, 9 and 10. FIG. 8 shows the embodiment in an exploded illustration, wherein it is evident that the worktop (1) is mated to a retaining frame (5). The retaining frame (5) has folding support legs (16), which, in FIG. 1, are folded in. The retaining frame (5) receives the retaining devices (3, 4). In FIG. 2, an exploded illustration of the embodiment is shown, wherein here the folding support legs (16) are folded out. FIG. 10 shows the embodiment in the assembled form when using 3 containers (8), wherein the folding support legs (16) are folded out. A particular advantage of this embodiment is its adjustable height which may be adapted to the body size of the user. On account thereof, a more sound working posture may be achieved. A further advantage of this embodiment consists in yet additional storage space being now located under the worktop (1). Thanks to the additional height in the case of folded-out support legs (16), containers (8) can not only be inserted when the extended retaining devices (3, 4) completely protrude beyond the periphery of a surface on which the embodiment is standing. This is an advantage, in particular in comparison to the embodiments 1 and 2. On account of the additional height, insertion of the containers (8) is possible above the table. After use of the device, the folding support legs may be folded in, enabling space saving storage.

Figure 11:
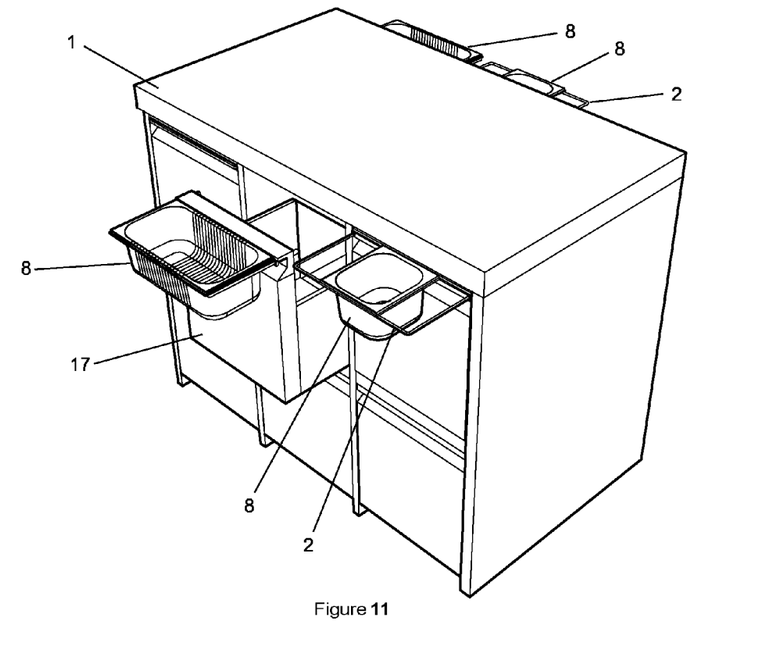
In FIG. 11 a fifth embodiment in which the retaining devices are integrated in drawers under the worktop is illustrated in a perspective view.

A fifth embodiment is illustrated in FIG. 11. In the case of this embodiment, a plurality of drawers (17) which may receive the retaining devices (2) are located under the worktop (1). This embodiment permits the simultaneous use of drawers (17) and retaining devices (2). In the retracted state of the drawers (17), the retaining devices are preferably extended. In order to obtain access to the contents of the drawers, the retaining devices (2) can be retracted. Of course, it is also possible for a drawer (17) to be extended, as illustrated in FIG. 11, despite the associated retaining device (2) being furthermore used for receiving a container (8).

LIST OF REFERENCE SIGNS

1 Worktop
2 Extendable bracket
3 Outer extendable bracket
4 Inner extendable bracket
5 Retaining frame
6 Widening of a bracket end
7 Boring
8 Container
9 Bracket in the completely extended position
10 Bracket in a partially extended position
11 Bracket in the completely retracted position
12 Clearance
13 Bracket mounting
14 Gridiron mounting with gridiron
15 Support leg
16 Folding support leg
17 Drawer

The invention claimed is:

1. A worktop assembly, comprising
a worktop having a worktop plane;
a cabinet;
at least one drawer extendably installed within the cabinet and below the plane of the worktop;
a first extendable retaining device implemented as a U-shaped bracket slidable between a retracted position and a fully extended position relative said worktop, the first extendable retaining device having,
a first pair of sides, wherein
the sides of the first pair of sides are parallel to one another,
the first pair of sides defines a first plane parallel to said worktop plane,
the sides of the first pair of sides are offset from one another by an operational width of the first retaining device, and
a first base extending between and connecting the sides of the first pair of sides;
wherein the first extendable retaining device is laterally guided into the at least one drawer, and wherein the first extendable retaining device is configured to accept a first container, a second container, or both the first and second containers when the first extendable retaining device is either partially extended or fully extended relative to the worktop surface;
a second extendable retaining device implemented as a U-shaped bracket slidable between a retracted position and a fully extended position relative said worktop, the second extendable retaining device having,
a second pair of sides, wherein
the sides of the second pair of sides are parallel to one another,
the second pair of sides defines a second plane parallel to said worktop plane,
the sides of the second pair of sides are offset from one another by an operational width of the second retaining device, and
a second base extending between and connecting the sides of the second pair of sides;
wherein the second extendable retaining device is laterally guided into the at least one drawer, and wherein the second extendable retaining device is configured to accept the first container, the second container, or both the first and second containers when the second extendable retaining device is either partially extended or fully extended relative to the worktop surface;
wherein the first container is adapted to operationally engage the first or second extendable retaining device when the first or second extendable retaining device is at least partially extended relative to the worktop surface;
wherein the second container is adapted to operationally engage the first or second extendable retaining device when the first or second extendable retaining device is at least partially extended relative to the worktop surface;
wherein the first extendable retaining device and the second extendable retaining device are adapted to simultaneously engage the first container and the second container;
wherein the first extendable retaining device and the second extendable retaining device are adapted to simultaneously engage the second container;
wherein the first extendable retaining device and the second extendable retaining device can be moved independently of one another;
wherein the first plane is coincident with the second plane;
wherein the second pair of sides is between the first pair of sides;
wherein the first extendable retaining device and the second extendable retaining device are movable independently of one another;
wherein when the first, second, or both the first and second containers are operationally engaged with the first extendable retaining device and the at least one drawer is not extended, the first container, second container, or both the first and second containers, are covered in part by an upper periphery of the worktop in a manner such that any gaps disposed between the edge of the first, second, or both the first and second containers and the worktop are eliminated; and
wherein when the first, second, or both the first and second containers are operationally engaged with the first extendable retaining device and the at least one drawer is extended, the first, second, or both the first and second containers and the first extendable retaining device do not restrict access to the drawer and its contents.

* * * * *